United States Patent [19]

Sorensen

[11] Patent Number: 5,262,112

[45] Date of Patent: * Nov. 16, 1993

[54] DIMENSION-CONTROL AND CLAMP REDUCTION DURING INJECTION MOLDING OF LAMINATED PRODUCTS

[75] Inventor: Jens O. Sorensen, Rancho Santa Fe, Calif.

[73] Assignee: Primtec, Rancho Santa Fe, Calif.

[ * ] Notice: The portion of the term of this patent subsequent to Apr. 16, 2008 has been disclaimed.

[21] Appl. No.: 911,916

[22] Filed: Jul. 10, 1992

Related U.S. Application Data

[60] Division of Ser. No. 646,641, Feb. 1, 1991, Pat. No. 5,149,482, which is a continuation-in-part of Ser. No. 361,275, Jun. 5, 1989, filed as PCT/US90/02982, May 30, 1990, Pat. No. 5,008,064.

[51] Int. Cl.$^5$ .............................................. B29C 45/14
[52] U.S. Cl. .................................. 264/255; 264/268; 264/328.12; 264/328.16; 425/577
[58] Field of Search ............ 264/255, 267, 268, 271.1, 264/279, 308, 297.2, 328.8, 328.9, 328.12, 328.16; 425/127, 129.1, 552, 577

[56] References Cited

U.S. PATENT DOCUMENTS

| | | | |
|---|---|---|---|
| 3,169,689 | 2/1965 | Schwartz | 229/1.5 |
| 3,178,497 | 4/1965 | Moscicki . | |
| 3,194,468 | 7/1965 | Baron | 229/1.5 |
| 3,375,554 | 3/1968 | Blumer . | |
| 3,679,119 | 7/1922 | Copping | 229/15 |
| 3,737,272 | 6/1973 | Segmuller | 425/248 |
| 3,832,110 | 8/1974 | Hehl | 425/130 |
| 3,944,124 | 3/1976 | Hexel | 229/1.5 |
| 3,995,008 | 11/1976 | Spiegelberg | 264/328 |
| 4,140,828 | 2/1979 | Copping | 428/167 |
| 4,264,295 | 4/1981 | Hingley | 425/577 |
| 4,307,137 | 12/1981 | Ota et al. | 428/35 |
| 4,381,275 | 4/1983 | Sorensen | 264/328.8 |
| 4,422,995 | 12/1983 | Schad | 264/250 |
| 4,467,994 | 8/1984 | Sorensen | 249/144 |
| 4,508,676 | 4/1985 | Sorensen | 264/328.8 |
| 4,743,420 | 5/1988 | Dutt | 264/102 |
| 4,789,326 | 12/1988 | Sorensen | 425/575 |
| 4,807,775 | 2/1989 | Sorensen | 220/72 |
| 5,008,064 | 4/1991 | Sorensen | 264/308 |

FOREIGN PATENT DOCUMENTS

| | | |
|---|---|---|
| 175777 | 7/1970 | Australia . |
| 1816466 | 6/1970 | Fed. Rep. of Germany . |
| 60-71217 | 4/1985 | Japan . |
| 2138736 | 10/1984 | United Kingdom . |

Primary Examiner—Jill L. Heitbrink
Attorney, Agent, or Firm—Edward W. Callan

[57] ABSTRACT

The dimensions of an injection molded hollow plastic product having laminated walls is controlled and the separative forces exerted against mold sections during molding of the products within a cavity of a mold having a core section and a cavity section defining the mold cavity therebetween, are reduced by methods including the steps of (a) injecting a first plastic material into the mold cavity; (b) cooling the injected first plastic material in the mold cavity; (c) injecting subsequent to injecting the first plastic material, a second plastic material into the mold cavity so that the cooled injected first plastic material is sufficiently solidified to stabilize the core section in relation to the cavity section by impeding movement of the core section in relation to the cavity section caused by injecting the second plastic material, whereby the injected second plastic material further fills the mold cavity; and (d) cooling the injected plastic material in the mold cavity to thereby solidify the molded product; wherein step (a) comprises the step of: (e) continuing the injection of the first plastic material by the second plastic material without intermission.

14 Claims, 2 Drawing Sheets

DIMENSION-CONTROL AND CLAMP REDUCTION DURING INJECTION MOLDING OF LAMINATED PRODUCTS

CROSS REFERENCE TO RELATED APPLICATION

This application is a division of copending application Ser. No. 07/646,641, filed Feb. 1, 1991 now U.S. Pat. No. 5,149,482, issued Sep. 22, 1992, which is a continuation in part of U.S. patent application Ser. No. 07/361,275 filed Jun. 5, 1989 filed as PCT/US90/02982, May 30, 1990, now U.S. Pat. No. 5,008,064, issued Apr. 16, 1991.

BACKGROUND OF THE INVENTION

The present invention generally pertains to injection molding of plastic products and is particularly directed to improvement in methods of controlling the wall thickness of a plastic product while being injection molded and improvement in methods of reducing the clamping force requirements of a plastic product while being injection molded.

Prior art methods for controlling the wall thickness of a plastic product while being injection molded and for reducing the clamping force requirements of a plastic product while being injection molded are described in U.S. Pat. No. 3,375,554 to Blumer, U.S. Pat. No. 3,737,272 to Segmuller, U.S. Pat. No. 3,995,007 to Spiegelberg, U.S. Pat. No. 4,264,295 to Hingley and U.S. Pat. Nos. 4,381,275; 4,467,994; 4,508,676 and 4,789,326 all to Sorensen.

SUMMARY OF THE INVENTION

The present invention provides a method of controlling the dimensions of a hollow plastic product having laminated walls injection molded within a cavity of a mold having a core section and a cavity section defining the mold cavity therebetween, comprising stabilizing the core section in relation to the cavity section and providing in advance an early layer of the laminated plastic product encased in the mold cavity and further comprising the steps of:

(a) injecting a first plastic material into the mold cavity which encases the early layer so that only a region of the early layer is coated by the injected first plastics material;

(b) cooling the injected first plastic material in the mold cavity;

(c) injecting subsequent to injecting the first plastic material, a second plastic material into the mold cavity so that the cooled injected first plastic material extending between the early layer and either the core section or the cavity section in combination with the early layer of said region are sufficiently solidified to stabilize the core section in relation to the cavity section by impeding movement of the core section in relation to the cavity section caused by injecting the second plastic material, whereby the injected second plastic material further fills the mold cavity thereby further coating the early layer; and (d) cooling the injected plastic material in the mold cavity to thereby solidify the laminated product wherein step (a) comprises the step of:

(e) continuing the injection of the first plastic material by the second plastic material without intermission.

The present invention further provides a method of reducing the clamping force required to produce a plastic product having laminated walls injection molded within a cavity of a mold having a first mold section and a second mold section defining the cooling cavity therebetween, comprising providing in advance an early layer of the laminated plastic product encased in the mold cavity and further comprising the steps of:

(a) injecting a first plastic material into the mold cavity which encases the early layer so that only a region of the early layer is coated by the injected first plastics material;

(b) cooling the injected first plastic material in the mold cavity to solidify a portion of the first plastic material in a section of the mold cavity extending between the first mold section and the second mold section;

(c) injecting a second plastic material under pressure into the mold cavity subsequent to solidifying said portion of the first plastic material, so that the cooled injected first plastic material in combination with the early layer of said region impedes transmission of injection pressure caused by injecting the second plastic material to thereby reduce during injection of the second plastic material the clamping force required to overcome forces that tend to separate the first and second mold sections as a result of injection pressure, whereby the injected second plastic material further fills the mold cavity thereby further coating the early layer; and (d) cooling the injected plastic material in the mold cavity to thereby solidify the laminated product wherein step (a) comprises the step of:

(e) continuing the injection of the first plastic material by the second plastic material without intermission.

The present invention still further provides a method of controlling the dimensions of a hollow plastic product having laminated walls injection molded in a cavity of a mold having a core section and a cavity section defining the cooling cavity therebetween, comprising stabilizing the core section in relation to the cavity section and comprising the steps of:

(a) injecting a first plastic material into the mold cavity;

(b) cooling the injected first plastic material in the mold cavity;

(c) injecting subsequent to injecting the first plastic material, a second plastic material into the mold cavity so that the cooled injected first plastic material extending between the core section and the cavity section is sufficiently solidified to stabilize the core section in relation to the cavity section by impeding movement of the core section in relation to the cavity section caused by injecting the second plastic material, whereby the injected second plastic material further fills the mold cavity;

(d) cooling the injected plastic material in the mold cavity to thereby solidify the laminated product; and (e) encasing the early layer in a second mold cavity and injecting additional plastic material into the second mold cavity thereby coating the early layer with the additional plastic material to mold the laminated plastic product wherein step (a) comprises the step of:

(f) continuing the injection of the first plastic material by the second plastic material without intermission.

The present invention additionally provides a method of reducing the clamping force required to produce a plastic product having laminated walls injection molded in a cavity of a mold having a first mold section and a second mold section defining the cooling cavity therebetween, comprising (a) injecting a first plastic material into the mold cavity;

(b) cooling the injected first plastic material in the mold cavity to solidify a portion of the first plastic material in a section of the mold cavity extending between the first mold section and the second mold section;

(c) injecting a second plastic under pressure into the mold cavity subsequent to solidifying said portion of the first plastic material, so that the cooled injected first plastic material impedes transmission of injection pressure caused by injecting the second plastic material, to thereby reduce during injection of the second plastic material the clamping force required to overcome forces that tend to separate the first and second mold sections as a result of injection pressure, whereby the injected second plastic material further fills the mold cavity;

(d) cooling the injected plastic material in the mold cavity to thereby provide an early layer of the laminated product; and (e) encasing the early layer in a second mold cavity and injecting additional plastic material into the second mold cavity thereby coating the early layer with the additional plastic material to mold the laminated plastic product wherein step (a) comprises the step of:

(f) continuing the injection of the first plastic material by the second plastic material without intermission.

Additional features of the present invention are described in relation to the description of the preferred embodiments.

Figure 1:
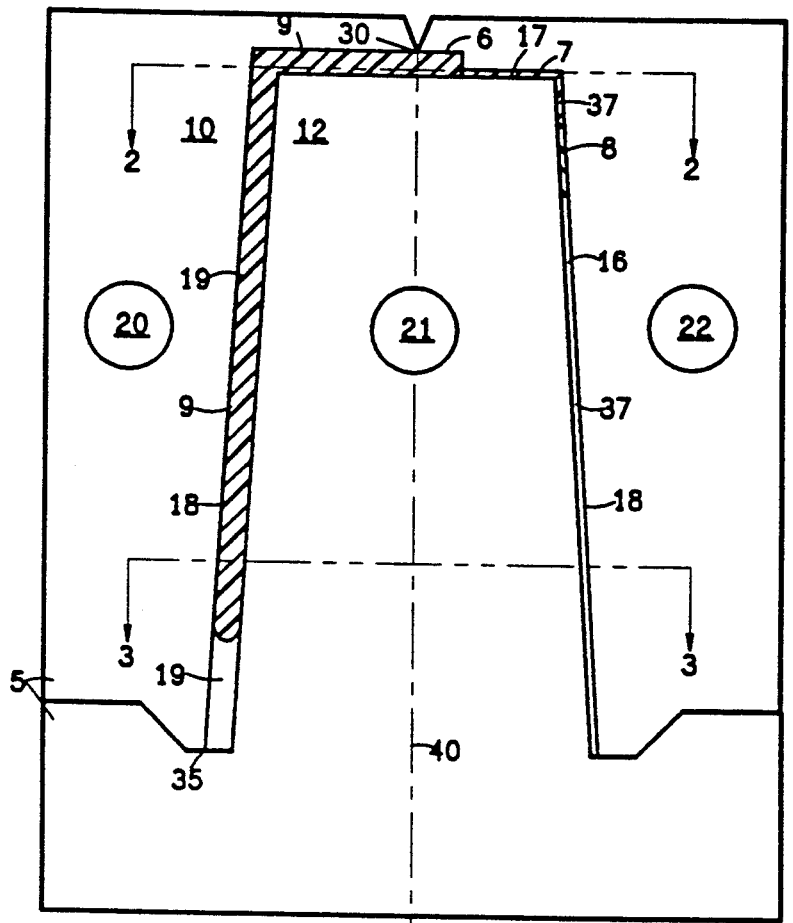
FIG. 1 is a sectional view of a mold used to execute one preferred embodiment of the method of the present invention.
Figure 2:
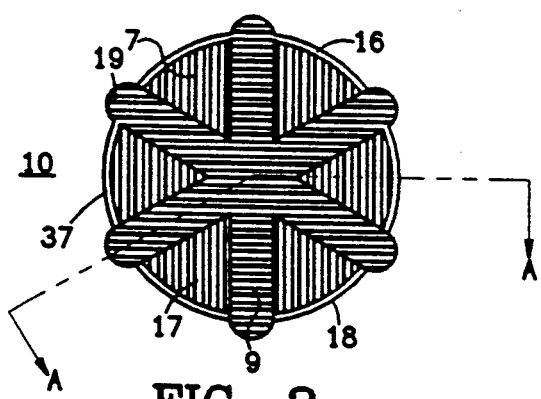
FIG. 2 is a sectional view of the mold shown in FIG. 1 taken along lines 2—2.
Figure 3:
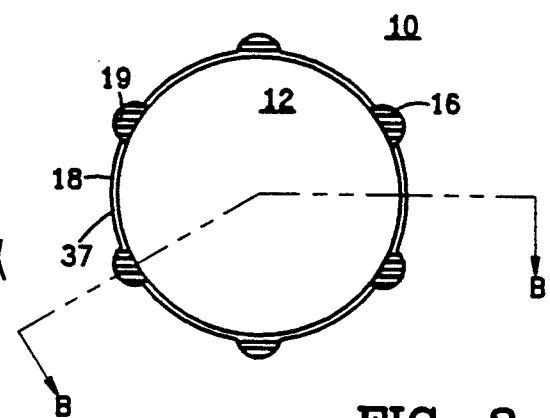
FIG. 3 is a sectional view of the mold shown in FIG. 1 taken along lines 3—3.

The sectional view of FIG. 1 is taken along lines 1—1 of FIG. 2 and along lines 1—1 of FIG. 3.

Figure 4:
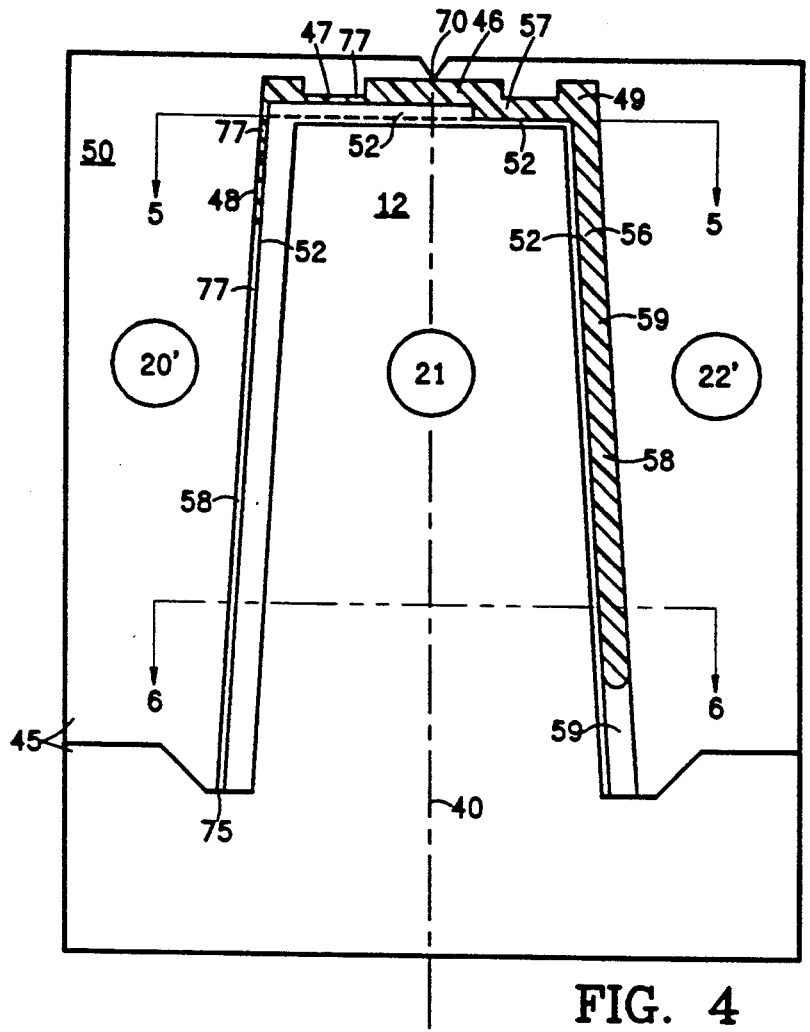

FIG. 4 is a sectional view of a mold used to execute a preferred embodiment of the method of the present invention for molding a hollow plastic product with laminated walls.

Figure 5:
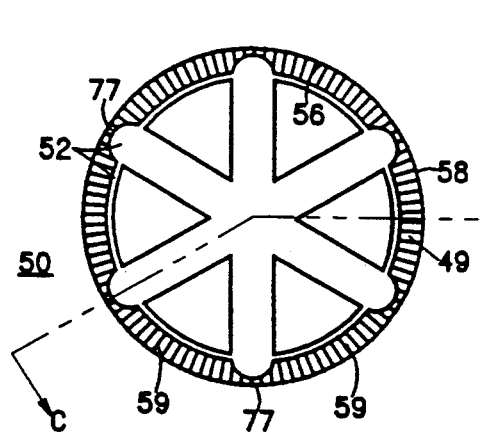

FIG. 5 is a sectional view of the mold shown in FIG. 4 taken along lines 5—5.

Figure 6:
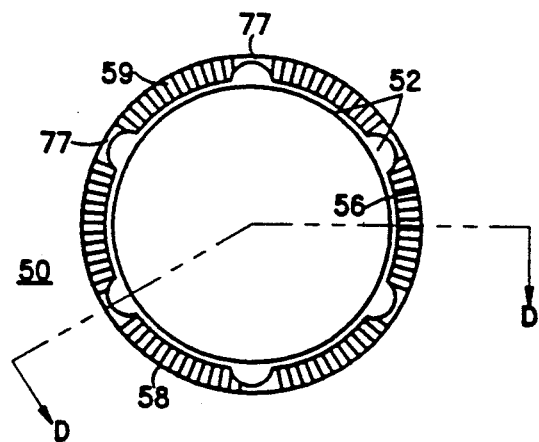

FIG. 6 is a sectional view of the mold shown in FIG. 4 taken along lines 6—6.

The sectional view of FIG. 4 is taken along lines 4—4 of FIG. 5 and along lines 4—4 of FIG. 6.

The product wall thickness shown in the Drawing are increased in order to better show the invention. The actual wall thicknesses are normally much smaller, and depend on the type of plastic material, the temperature of the plastic material, the mold temperature, the thermal conductivity of the mold wall material, the flow distances, the injection pressure, and other molding parameters.

DESCRIPTION OF THE PREFERRED EMBODIMENTS

Referring to FIGS. 1, 2 and 3, the preferred embodiment of the invention utilizes a mold 5 with a cavity mold section 10 and a core mold section 12, shown in its assembled arrangement. The mold 5 defines a mold cavity 16 for forming a plastic product having perimetric side walls, not shown in its fully molded outline. The mold cavity 16 includes a base region 17, a side-wall-defining region 18 and flow channels 19 extending from the base region 17 through the side-wall-defining region 18.

Cooling means 20, 21 and 22 are used to cool both the first and second injected plastic material. Molten plastic material may be injected into the mold cavity 16 via a gate 30 located in the center of the base region 17 of the mold cavity 16. The cavity section 10 and the core section 12 are separated by a parting line 35. The mold cavity 16 may be opened along axis 40 for ejection of a molded product.

The methods of the preferred embodiment are executed as follows. A first plastic material 6, 7, 8, 9 is injected into the mold cavity 16 so that only a part of the mold cavity 16 is filled, a second plastic material is injected without intermission. The first plastic material has the same chemical composition as the second plastic material.

A portion of the first plastic material 7 cools in the thin cavity region 37 between flow channels 19 before the second plastic material is injected so that it is at least partially solidified and so that another portion of the first plastic material 6, 8, 9 remains fluid.

The at least partially solidified portion of the first plastic cools very fast before a second plastic material is injected, because the wall thickness of the thin-cavity region 37 is very thin. Another portion of the first plastic material 6, 8, 9 remains fluid because the wall thickness of the flow channels 19 is relatively thick.

Subsequent to injecting the first plastic material 6, 7, 8, 9, a second plastic material is injected into the mold cavity via the gate 30. The second plastic material displaces some of the fluid first plastic material in the flow channels 19, and thereby induces a number of flow paths 9 for the second plastic to fill the mold cavity 16.

Some of the at least partially solidified first plastic material 7 in the thin cavity regions 37 is sufficiently solidified to stabilize and support the core section 12 in relation to the cavity section 10 by impeding movement caused by injecting the second plastic material.

Some of the at least partially solidified first plastic material 7 in the thin cavity regions 37 is also sufficiently solidified to impede transmission of injection pressure in the first plastic material 7, caused by injecting the second plastic material which effect separative forces of the core mold section 12 in relation to the cavity mold section 10. The injected plastic material is then cooled to completely solidify the product.

The first plastic material is injected so that it does not completely cover the parting line 35 and fill the mold cavity 16, and the second plastic material is injected so that it completely covers the parting line and fills the mold cavity 16.

An example is as follows, the thin product wall thickness in the thin cavity regions 37 being 0.15 mm, the thick product wall thickness of the flow channels 19 being 0.6 mm, the plastic material being polypropylene or polystyrene at a temperature of 300 degrees C., the mold temperature being 10 degrees C., the thermal conductivity of the mold being that of steel, the flow distance through the side-wall defining region 18 of the flow channels 19 being about 150 mm, the distance between flow channels 19 being about 5 mm, and the injection pressure being 2000 Bar.

Referring to FIGS. 4, 5 and 6, the preferred embodiment of the invention used when molding a hollow plastic product with laminated walls utilizes a mold 45 with a cavity mold section 50 and a core mold section 12, shown in its assembled arrangement. The mold 45 defines a mold cavity 56 for forming a plastic product having laminated perimetric side walls, not shown in its fully molded outline. An early layer 52 of the laminated plastic product is encased on the core section 12 in the mold cavity 56. The early layer 52 was formed in accordance with the embodiment of the invention described with reference to FIGS. 1, 2 and 3.

The mold cavity 56 includes a base region 57, a sidewall-defining region 58 and flow channels 59 extending from the base region 57 through the side-wall-defining region 58.

Cooling means 20', 21 and 22' are used to cool both the first and second injected plastic material. Molten plastic material may be injected into the mold cavity 56 via a gate 70 located in the center of the base region 57 of the mold cavity 56. The cavity section 50 and the core section 12 are separated by a parting line 75. The mold cavity 56 may be opened along axis 40 for ejection of a molded product.

The methods of this preferred embodiment are executed as follows. A first plastic material 46, 47, 48, 49 is injected into the mold cavity 56 so that only a part of the mold cavity 56 is filled, a second plastic material is injected without intermission. The first plastic material has the same chemical composition as the second plastic material. Only a region of the early layer 52 is coated with the first plastic material 46, 47, 48, 49, as shown in FIG. 4.

A portion of the first plastic material 47 cools in the thin cavity region 77 between flow channels 59 before the second plastic material is injected so that it is at least partially solidified and so that another portion of the first plastic material 46, 48, 49 remains fluid.

The at least partially solidified portion of the first plastic cools very fast before a second plastic material is injected, because the wall thickness of the thin-cavity region 77 is very thin. Another portion of the first plastic material 46, 48, 49 remains fluid because the wall thickness of the flow channels 59 is relatively thick.

Subsequent to injecting the first plastic material 46, 47, 48, 49, a second plastic material is injected into the mold cavity via the gate 70. The second plastic material displaces some of the fluid first plastic material in the flow channels 59, and thereby induces a number of flow paths 49 for the second plastic to fill the mold cavity 56, and further coat the early layer 52.

Some of the at least partially solidified first plastic material 47 in the thin cavity regions 77 is sufficiently solidified to combine with a sufficiently solidified portion of the early layer 52 to stabilize and support the core section 12 in relation to the cavity section 50 by impeding movement caused by injecting the second plastic material.

Some of the at least partially solidified first plastic material 47 in the thin cavity regions 77 is also sufficiently solidified to combine with a sufficiently solidified portion of the early layer 52 to impede transmission of injection pressure in the first plastic material 47, caused by injecting the second plastic material which effect separative forces of the core mold section 12 in relation to the cavity mold section 50. The injected plastic material is then cooled to completely solidify the product.

The first plastic material is injected so that is does not completely cover the parting line 75 and fill the mold cavity 56, and the second plastic material is injected so that it completely covers the parting line and fills the mold cavity 56.

In the particular preferred embodiments of the invention described herein, contrary to certain prior art methods of core steering, no retractable portion of the core section and/or the cavity section is protracted to contact the other mold section to stabilize the core section in relation to the cavity section during the continuous injection of the plastic material; the configuration of the mold cavity as defined by the mold sections is maintained without change during the continuous injection of plastic material; the mold cavity is formed by combining mold sections that define a mold cavity that does not include any throttle between the base region and the side wall defining region; and no use is made of multiple gates, in order to create one or more flow path for the second plastic material to fill the mold cavity.

In other preferred embodiments of the present invention the first plastic material is injected into the mold cavity via more than one gate and the second plastic material is injected into the mold cavity via the same gates.

When the method of the invention is used only for reducing the required clamping force for the product and not for steering the core section, the method of the invention may be executed in molds which do not have a core section and a cavity section.

I claim:

1. A method of controlling the dimensions of a hollow plastic product having laminated walls injection molded within a cavity of a mold having a core section and a cavity section defining the mold cavity therebetween, comprising stabilizing the core section in relation to the cavity section and providing in advance an early layer of the laminated plastic product encased in the mold cavity and further comprising the steps of:

(a) injecting a first plastic material into the mold cavity which encases the early layer so that only a region of the early layer is coated by the injected first plastic material;

(b) cooling the injected first plastic material in the mold cavity;

(c) injecting subsequent to injecting the first plastic material, a second plastic material into the mold cavity so that the cooled injected first plastic material extending between the early layer and either the core section or the cavity section in combination with the early layer of said region are sufficiently solidified to stabilize the core section in relation to the cavity section by impeding movement of the core section in relation to the cavity section caused by injecting the second plastic material, whereby the injected second plastic material further fills the mold cavity, thereby further coating the early layer; and (d) cooling the injected plastic material in the mold cavity to thereby solidify the laminated product;

wherein step (a) comprises the step of:

(e) continuing the injection of the first plastic material by the second plastic material without intermission.

2. A method according to claim 1, wherein step (b) comprises the step of:

(f) cooling a portion of the first plastic material so that it is at least partially solidified and so that another portion of the first plastic material remains fluid; and wherein step (c) comprises the step of:

(g) injecting the second plastic material so that the second plastic material displaces some of the fluid first plastic material to thereby provide at least one flow path for the second plastic material to further fill the mold cavity and so that the cooled injected first plastic material in combination with the early layer of said region are sufficiently solidified to stabilize the core section in relation to the cavity section.

3. A method of reducing the clamping force required to produce a plastic product having laminated walls injection molded within a cavity of a mold having a first mold section and a second mold section defining the cooling cavity therebetween, comprising providing in advance an early layer of the laminated plastic product encased in the mold cavity and further comprising the steps of:

(a) injecting a first plastic material into the mold cavity which encases the early layer so that only a region of the early layer is coated by the injected first plastic material;

(b) cooling the injected first plastic material in the mold cavity to solidify a portion of the first plastic material in a section of the mold cavity extending between the first mold section and the second mold section;

(c) injecting a second plastic material under pressure into the mold cavity subsequent to solidifying said portion of the first plastic material, so that the cooled injected first plastic material in combination with the early layer of said region impedes transmission of injection pressure caused by injecting the second plastic material to thereby reduce during injection of the second plastic material the clamping force required to overcome forces that tend to separate the first and second mold sections as a result of injection pressure, whereby the injected second plastic material further fills the mold cavity, thereby further coating the early layer; and (d) cooling the injected plastic material in the mold cavity to thereby solidify the product;

wherein step (a) comprises the step of:

(e) continuing the injection of the first plastic material by the second plastic material without intermission.

4. A method according to claim 3, wherein step (b) comprises the step of:

(f) cooling a portion of the first plastic material so that it is at least partially solidified and so that another portion of the first plastic material remains fluid; and wherein step (c) comprises the step of:

(g) injecting the second plastic material so that the second plastic material displaces some of the fluid first plastic material to thereby provide at least one flow path for the second plastic material to further fill the mold cavity, and so that the cooled injected first plastic material in combination with the early layer of said region impedes transmission of injection pressure causing separative forces of the first mold section in relation to the second mold section.

5. A method of controlling the dimensions of a hollow plastic product having laminated walls injection molded in a cavity of a mold having a core section and a cavity section defining the mold cavity therebetween, comprising stabilizing the core section in relation to the cavity section and comprising the steps of:

(a) injecting a first plastic material into the mold cavity;

(b) cooling the injected first plastic material in the mold cavity;

(c) injecting subsequent to injecting the first plastic material, a second plastic material into the mold cavity so that the cooled injected first plastic material extending between the core section and the cavity section is sufficiently solidified to stabilize the core section in relation to the cavity section by impeding movement of the core section in relation to the cavity section caused by injecting the second plastic material, whereby the injected second plastic material further fills the mold cavity;

(d) cooling the injected plastic material in the mold cavity to thereby provide an early layer of the laminated plastic product; and (e) encasing the early layer in a second mold cavity and injecting additional plastic material into the second mold cavity thereby coating the early layer with the additional plastic material to mold the laminated plastic product;

wherein step (a) comprises the step of:

(f) continuing the injection of the first plastic material by the second plastic material without intermission.

6. A method according to claim 5, wherein step (b) comprises the step of:

(g) cooling a portion of the first plastic material so that it is at least partially solidified and so that another portion of the first plastic material remains fluid; and wherein step (c) comprises the step of:

(h) injecting the second plastic material so that the second plastic material displaces some of the fluid first plastic material to thereby provide at least one flow path for the second plastic material to fill the mold cavity, and so that some of the at least partially solidified first plastic material stabilizes the core section in relation to the cavity section.

7. A method according to claim 5, wherein step (e) comprises the steps of:

(g) injecting a first portion of the additional plastic material into the second mold cavity which encases the early layer so that only a region of the early layer is coated by the injected first portion of the additional plastic material;

(h) cooling the injected first portion of the additional plastic material in the mold cavity;

(i) injecting subsequent to injecting the first portion of the additional plastic material, a second portion of the additional plastic material into the second mold cavity so that the cooled injected first portion of the additional plastic material extending between the early layer and either the core section or the cavity section in combination with the early layer of said region are sufficiently solidified to stabilize the core section in relation to the cavity section by impeding movement of the core section in relation to the cavity section caused by injecting the second portion of the additional plastic material, whereby the injected second portion of the additional plastic material further fills the second mold cavity, thereby further coating the early layer.

8. A method of reducing the clamping force required to produce a plastic product having laminated walls injection molded in a cavity of a mold having a first mold section and a second mold section defining the cooling cavity therebetween, comprising (a) injecting a first plastic material into the mold cavity;

(b) cooling the injected first plastic material in the mold cavity to solidify a portion of the first plastic material in a section of the mold cavity extending between the first mold section and the second mold section;

(c) injecting a second plastic under pressure into the mold cavity subsequent to solidifying said portion of the first plastic material, so that the cooled injected first plastic material impedes transmission of injection pressure caused by injecting the second plastic material, to thereby reduce during injection of the second plastic material the clamping force required to overcome forces that tend to separate the first and second mold sections as a result of injection pressure, whereby the injected second plastic material further fills the mold cavity;

(d) cooling the injected plastic material in the mold cavity to thereby provide an early layer of the laminated product; and (e) encasing the early layer in a second mold cavity and injecting additional plastic material into the second mold cavity thereby coating the early layer with the additional plastic material to mold the laminated plastic product;

wherein step (a) comprises the step of:

(f) continuing the injection of the first plastic material by the second plastic material without intermission.

9. A method according to claim 8, wherein step of (b) comprises the step of:

(g) cooling a portion of the first plastic material so that it is at least partially solidified and so that another portion of the first plastic material remains fluid; and wherein step (c) comprises the step of:

(h) injecting the second plastic material so that the second plastic material displaces some of the fluid first plastic material to thereby provide at least one flow path for the second plastic material to fill the mold cavity and so that some of the at least partially solidified first plastic material impedes transmission of injection pressure causing separative forces of the first mold section in relation to the second mold section.

10. A method according to claim 8, wherein step (e) comprises the steps of:

(g) injecting a first portion of the additional plastic material into the second mold cavity which encases the early layer so that only a region of the early layer is coated by the injected first portion of the additional plastic material;

(h) cooling the injected first portion of the additional plastic material in the second mold cavity to solidify a portion of the first portion of the additional plastic material in a section of the second mold cavity extending between the first mold section and the second mold section;

(i) injecting a second portion of the additional plastic material under pressure into the second mold cavity subsequent to solidifying said portion of the first portion of the additional plastic material, so that the cooled injected first portion of the additional plastic material in combination with the early layer of said region impedes transmission of injection pressure caused by injecting the second portion of the additional plastic material to thereby reduce during injection of the second portion of the additional plastic material the clamping force required to overcome forces that tend to separate the first and second mold sections as a result of injection pressure, whereby the injected second portion of the additional plastic material further fills the second mold cavity, thereby further coating the early layer.

11. A method of controlling the dimensions of a hollow plastic product injection molded within a cavity of a mold having a core section and a cavity section defining the mold cavity therebetween, comprising the steps of:

(a) injecting a first plastic material into the mold cavity;

(b) cooling the injected first plastic material in the mold cavity;

(c) injecting subsequent to injecting the first plastic material, a second plastic material into the mold cavity so that the cooled injected first plastic material is sufficiently solidified to stabilize the core section in relation to the cavity section by impeding movement of the core section in relation to the cavity section caused by injecting the second plastic material, whereby the injected second plastic material further fills the mold cavity; and (d) cooling the injected plastic material in the mold cavity to thereby solidify the molded product;

wherein step (a) comprises the step of:

(e) continuing the injection of the first plastic material by the second plastic material without intermission.

12. A method according to claim 11, wherein step (b) comprises the step of:

(f) cooling a portion of the first plastic material so that it is at least partially solidified and so that another portion of the first plastic material remains fluid; and wherein step (c) comprises the step of:

(g) injecting the second plastic material so that the second plastic material displaces some of the fluid first plastic material to thereby provide at least one flow path for the second plastic material to further fill the mold cavity and so that the cooled injected first plastic material is sufficiently solidified to stabilize the core section in relation to the cavity section.

13. A method of reducing the clamping force required to produce a plastic product injection molded within a cavity of a mold having a first mold section and a second mold section defining the cooling cavity therebetween, comprising the steps of:

(a) injecting a first plastic material into the mold cavity;

(b) cooling the injected first plastic material in the mold cavity to solidify a portion of the first plastic material in a section of the mold cavity extending between the first mold section and the second mold section;

(c) injecting a second plastic material under pressure into the mold cavity subsequent to solidifying said portion of the first plastic material, so that the cooled injected first plastic material impedes transmission of injection pressure caused by injecting the second plastic material to thereby reduce during injection of the second plastic material the clamping force required to overcome forces that tend to separate the first and second mold sections as a result of injection pressure, whereby the injected second plastic material further fills the mold cavity; and (d) cooling the injected plastic material in the mold cavity to thereby solidify the product;

wherein step (a) comprises the step of:

(e) continuing the injection of the first plastic material by the second plastic material without intermission.

14. A method according to claim 13, wherein step (b) comprises the step of:

(f) cooling a portion of the first plastic material so that it is at least partially solidified and so that another portion of the first plastic material remains fluid; and wherein step (c) comprises the step of:

(g) injecting the second plastic material so that the second plastic material displaces some of the fluid first plastic material to thereby provide at least one flow path for the second plastic material to further fill the mold cavity, and so that the cooled injected first plastic material impedes transmission of injection pressure causing separative forces of the first mold section in relation to the second mold section.

* * * * *